(No Model.)　　　　　　　　　　　　　　　　2 Sheets—Sheet 1.
A. W. GRANT.
ROLLER BEARING FOR VEHICLES.

No. 580,343.　　　　　　　　　　　Patented Apr. 6, 1897.

Witnesses
G. M. Gridley
Chas. I. Welch

Inventor
Arthur W. Grant
By his Attorney (No Model.) 2 Sheets—Sheet 2.

A. W. GRANT.
ROLLER BEARING FOR VEHICLES.

No. 580,343. Patented Apr. 6, 1897.

Witnesses
G. M. Gridley
Chas. I. Welch

Inventor
Arthur W. Grant
By his Attorney

UNITED STATES PATENT OFFICE.

ARTHUR W. GRANT, OF SPRINGFIELD, OHIO, ASSIGNOR TO THE RUBBER TIRE WHEEL COMPANY, OF SAME PLACE.

ROLLER-BEARING FOR VEHICLES.

SPECIFICATION forming part of Letters Patent No. 580,343, dated April 6, 1897.

Application filed August 15, 1895. Serial No. 559,358. (No model.)

*To all whom it may concern:*

Be it known that I, ARTHUR W. GRANT, a citizen of the United States, residing at Springfield, in the county of Clark and State of Ohio, have invented certain new and useful Improvements in Roller-Bearings for Vehicles, of which the following is a specification.

My invention relates to improvements in roller-bearings for vehicles; and the object of my invention is to simplify the constructions heretofore employed in devices of this character.

To this end my invention consists in the various constructions and combinations of parts hereinafter described, and set forth in the claims.

Figure 1:
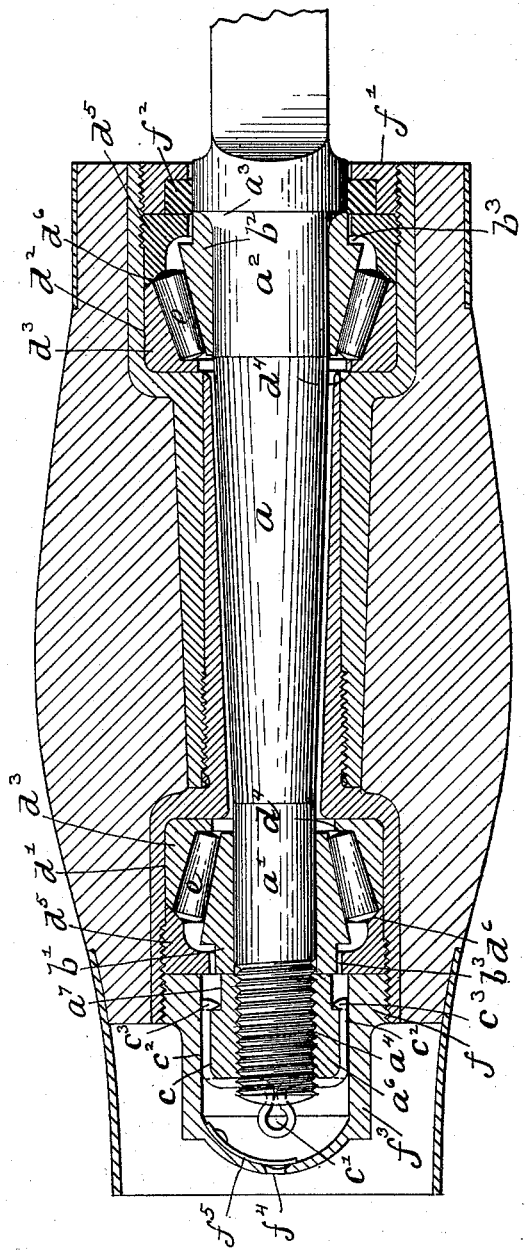
Figure 4:
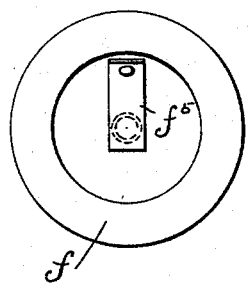
Figure 3:
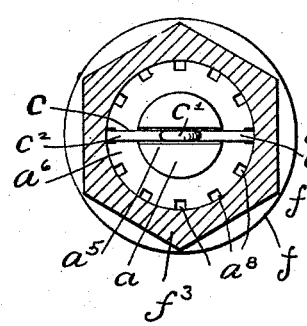
Figure 2:
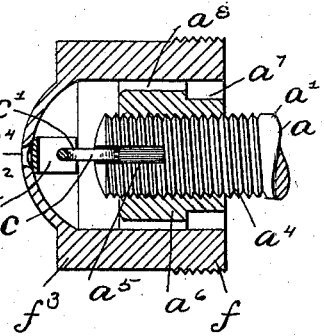
Figure 5:
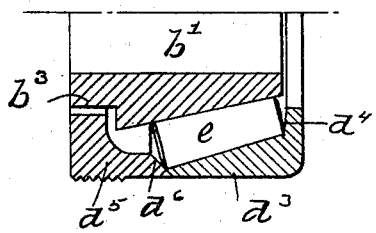
Figure 6:
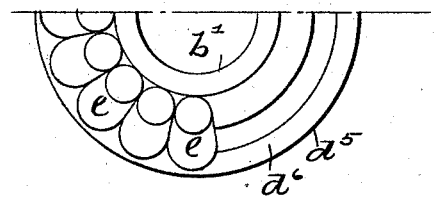
Figure 7:
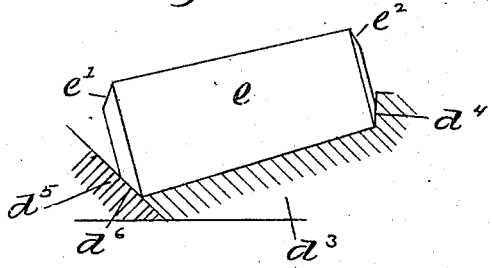

In the accompanying drawings, Figure 1 is a longitudinal sectional view of a device embodying my invention. Figs. 2 and 3 are respectively a longitudinal and transverse sectional view of portions of the same, showing part of the devices for adjusting the bearing. Fig. 4 is a detail view of the cap. Figs. 5 and 6 are detail views of the bearing proper. Fig. 7 is a detail view, on a larger scale, showing the arrangement of the rollers with reference to their supporting-bearings.

Like parts are represented by similar letters of reference in the several views.

In the said drawings, $a$ represents a spindle of an ordinary vehicle-axle, which may be tapered in the usual way, so as to be smaller at the point than at the heel, but is preferably turned down, as shown at $a'$ $a^2$, to form straight bearing portions near the point and heel, on which are journaled the cone-shaped bearing-rings $b'$ $b^2$. These cone-shaped bearing-rings $b'$ $b^2$ fit snugly on the bearing portions $a'$ $a^2$ of the spindle, the rear sleeve being fitted at the rear end to the shoulder $a^3$ of the spindle. The cone-shaped bearing rings or sleeves on the spindle are placed with their small ends toward the center of the hub. The spindle $a'$ is screw-threaded in the usual manner at the outer end, as shown at $a^4$, and is further provided with a transverse slot $a^5$ at the end, as shown in Figs. 2 and 3. On the screw-threaded portion $a^4$ of the spindle there is fitted a nut $a^6$, the outer periphery of which is for a portion of its length turned down, as shown at $a^7$, the end of said nut being adapted to bear against the cone-sleeve $b'$ and move the same along the axle for the purpose of adjustment, as hereinafter more fully described. The other portion of the nut $a^6$ is notched on its periphery with a series of grooves $a^8$, which extend from the outer periphery to a point about half the depth of the shoulder formed by the reduced portion $a^7$ of said hub. To provide for holding this nut from turning on the axle, I provide a bifurcated spring-key $c$, preferably formed of a single piece of metal with a central loop $c'$ and extending legs $c^2$, having hook-shaped ends $c^3$, said key being adapted to fit into the slotted opening $a^5$, with the legs $c^2$ thereof fitted into opposite grooves or notches $a^8$ in said nut, with the hook-shaped ends $c^3$ engaging the shoulder at the end of the reduced portion $a^7$.

The vehicle-hub proper is provided at the respective ends with chambers $d'$ $d^2$, which may be formed in any suitable manner. In each of these chambers there is seated a bearing-ring $d^3$, having at one end a shoulder $d^4$ and provided with an inner inclined or tapered wall which when the hub is on the spindle forms with the conical sleeves a wedge-shaped annular space to receive the tapered rollers $e$, the large ends of which are placed opposite the larger ends of the conical sleeves.

To provide for holding the rollers in position in the hub, I employ retaining-rings $d^5$, which are in effect part of the conical bearing-rings $d^3$, as the inner ends of said retaining-rings are adapted to fit against the ends of the bearing-rings, the respective ends being beveled, as shown, where they join. The retaining-rings are screw-threaded on their outer peripheries for a portion of their length and are adapted to be screwed into the respective chambers $d'$ $d^2$ in the ends of the hub, so as to engage the bearing-rings and also the ends of the rollers, the retaining-rings being each provided with an inclined bearing-surface $d^6$ for this purpose and the ends of the rollers being correspondingly beveled, as shown at $e'$ $e^2$, to form bearing-surfaces to rest against the respective shoulders $d^4$ and $d^6$, as shown more clearly in Fig. 7.

To provide for locking the retaining-rings firmly in their positions, I preferably employ locking nuts or rings $f$ and $f'$. The ring $f'$ is preferably turned out to form a recess in which is placed a washer $f^2$, of felt or similar material, at the inner or heel end of the spindle, the construction being such that the locking-ring when turned tight against the retaining-ring will also clamp the felt washer laterally and hold it firmly in the recess in said ring, the washer being adapted to fit snugly on the outer periphery of the axle above the shoulder $a^3$. The front locking-ring $f$ is preferably constructed as a part of a cap $f^3$, which is projected outwardly with the perimeter of the extended portion hexagonal or of a suitable polygonal shape, so that it may be readily removed or replaced by an ordinary wrench by unscrewing the screw-threaded ring portion $f$ from the chamber $d'$. This cap $f^3$ is turned out to fit snugly over the nut $a^6$, with the legs $c^2$ of the U-shaped spring-key within the notches, as described, the cap when in place preventing the removal or displacement of said key. The cap $f^3$ is further provided at the outer end with an opening $f^4$, normally closed by a spring-shaped cap $f^5$, which covers said opening from the inside, but is adapted to be pressed inwardly for the purpose of oiling.

Each of the cone-shaped sleeves $b'$ $b^2$ is shouldered down, as shown at $b^3$, and the retaining-rings $d^5$ are bored out to fit loosely over the reduced portion thereof, so that so long as the retaining-rings are in place the cone-shaped bearing-sleeves are also held within the chambers $d'$ $d^2$ of the hub. Means are thus provided by which upon removing the cap $f^3$ and the nut $a^6$ the entire axle with the bearing portion, including the rollers and cone-shaped sleeves, may be removed from the spindle while the parts are retained in their proper relative positions, and the bearing-rollers cannot become lost or disarranged.

By having the cap $f^3$ and washer $f^2$, as described, all the parts are completely inclosed and may be kept properly lubricated by oiling through the opening $f^4$ by inserting the nose of an oil-can against the spring-cap $f^5$ and pressing the same back sufficiently to admit the oil, which finds its way to the notched periphery of the nut and into the respective bearings.

To adjust the bearings, the cap $f^3$ is screwed out and the spring-key $c$ removed from the nut and axle. The nut is then turned in the proper direction to cause the cones to approach or recede from each other, thus securing the adjustment desired, when, after bringing two of the notches in line with the slotted opening in the axle, the key is replaced, the cap again screwed into position, and the parts are held firmly against any possible displacement, with the bearings completely inclosed and protected from dust or dirt.

The hook-shaped ends $c^3$ of the spring-key are preferably beveled slightly where they engage the shoulder on the nut, so that when the cap is removed the key may be withdrawn by simply pulling on the end thereof, the cap holding the same against possible displacement when in place.

Having thus described my invention, I claim—

1. The combination with the axle, a bearing-cone thereon, a hub having a chamber, a bearing-ring and a retaining-ring therein, said retaining-ring being screw-threaded and adapted to engage said bearing-ring, and also bored out to fit over the end of said cone-bearing which is shouldered down to receive said retaining-ring, a locking-ring also screwed into said chamber and adapted to bear against said retaining-ring, said locking-ring being recessed to receive a washer which is clamped between said locking-ring and said retaining-ring, substantially as specified.

2. The combination with the cone-bearing and the bearing-ring, said bearing-ring being fitted into a chamber and having a beveled end, a retaining-ring screw-threaded into said chamber and beveled at one end to fit the bevel of said bearing-ring, the tapered portion of said retaining-ring being adapted to extend beyond the bearing-surface of said bearing-ring and form a beveled shoulder at the end thereof, and a series of tapered rollers arranged between said bearing-cone and bearing-ring and having their ends beveled to fit the beveled surface of said retaining-ring, substantially as specified.

3. The combination with a vehicle-hub having a chamber therein, a bearing-ring seated in said chamber and beveled at one end as described, and a retaining-ring beveled to fit the end of said bearing-ring and screw-threaded in said chamber, a cone-bearing arranged within said bearing-ring and having a reduced portion surrounded by the retaining-ring, said retaining-ring being bored out to receive said reduced portion, a screw-threaded nut adapted to engage said cone-shaped bearing and provided with detachable means for holding it in different positions of adjustment, and a cap screwed into said chamber so as to engage said retaining-ring, said cap being also adapted to hold in place the detachable connections of said screw-threaded nut, substantially as specified.

4. The combination with an axle having a cone-shaped bearing, and a screw-threaded nut to engage said bearing, and detachable means for holding said nut in different positions of adjustment, a chambered hub having a bearing-ring seated therein, and a retaining-ring screw-threaded in said chamber so as to engage said bearing-ring, a screw-threaded cap also screwed into said chamber to engage said retaining-ring, said screw-threaded cap being adapted to surround said adjusting-nut and hold the retaining devices thereof in position, and a series of tapered rollers arranged between said bearing-ring and cone-shaped bearing, substantially as specified.

5. In a roller-bearing, a tapered roller having beveled ends as described, a bearing-ring having a shoulder, and a retaining-ring having a beveled end to engage said bearing-ring and adapted to form a shoulder at the other end of said retaining-ring, the respective shoulders being formed to fit the tapered ends of said roller, substantially as specified.

6. The combination with a screw-threaded axle having a transverse slot in the end thereof, of a screw-threaded nut on said axle having on its periphery longitudinal notches and an annular shoulder as described, and a U-shaped spring-key to fit in the slot in said axle and engage said longitudinal grooves and shoulder, and a cap to fit over said nut so as to retain said key in its seat substantially as specified.

7. The combination with a screw-threaded axle having a transverse slot as described, of a screw-threaded nut on said axle, said nut having longitudinal peripheral grooves, and a U-shaped spring-key adapted to engage in said slot with the respective legs thereof fitted in oppositely-arranged longitudinal grooves, and a cap to fit over said nut so as to retain the legs of said key in said grooves substantially as specified.

In testimony whereof I have hereunto set my hand this 8th day of July, A. D. 1895.

ARTHUR W. GRANT.

Witnesses:
OLIVER H. MILLER,
CHAS. I. WELCH.